US010826806B2

(12) United States Patent
Schmid et al.

(10) Patent No.: US 10,826,806 B2
(45) Date of Patent: Nov. 3, 2020

(54) SYSTEM FOR TRANSMITTING AUDIO AND/OR VIDEO DATA AND METHOD FOR GRANTING SECURED ACCESS

(71) Applicant: Rohde & Schwarz GmbH & Co. KG, Munich (DE)

(72) Inventors: Bjoern Schmid, Munich (DE); Hannes Strobel, Dorfen/Icking (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 315 days.

(21) Appl. No.: 15/937,458

(22) Filed: Mar. 27, 2018

(65) Prior Publication Data
US 2018/0288038 A1   Oct. 4, 2018

(30) Foreign Application Priority Data

Mar. 28, 2017 (EP) .................................... 17163287
May 22, 2017 (EP) .................................... 17172270

(51) Int. Cl.
| | |
|---|---|
| *H04L 12/26* | (2006.01) |
| *H04L 29/14* | (2006.01) |
| *H04L 29/06* | (2006.01) |
| *H04L 12/24* | (2006.01) |
| *G06F 11/07* | (2006.01) |

(52) U.S. Cl.
CPC .......... *H04L 43/08* (2013.01); *G06F 11/0709* (2013.01); *G06F 11/0793* (2013.01); *H04L 41/0213* (2013.01); *H04L 43/0847* (2013.01); *H04L 63/0272* (2013.01);
(Continued)

(58) Field of Classification Search
CPC ....... H04L 43/08; H04L 69/40; H04L 63/108; H04L 43/0847; H04L 41/0213; H04L 63/0853; H04L 63/10; H04L 63/20; H04L 9/3213; G06F 11/0709; G06F 11/0793
See application file for complete search history.

(56) References Cited

U.S. PATENT DOCUMENTS

| | | |
|---|---|---|
| 7,151,966 B1 | 12/2006 | Baier et al. |
| 8,806,550 B1 | 8/2014 | Chan |

(Continued)

FOREIGN PATENT DOCUMENTS

| | | |
|---|---|---|
| CN | 104506393 A | 4/2015 |
| CN | 204993451 U | 1/2016 |

(Continued)

OTHER PUBLICATIONS

Extended European Search Report dated May 23, 2017, issued in priority European Application No. 17163287.0, filed Mar. 28, 2017, 8 pages.
(Continued)

*Primary Examiner* — Michael R Vaughan
(74) *Attorney, Agent, or Firm* — Christensen O'Connor Johnson Kindness PLLC

(57) ABSTRACT

A system for transmitting audio and/or video data is described that comprises a functional unit configured to process the audio and/or video data and an error detection unit configured to detect an error in audio and/or video data processing. The system is configured to generate and transmit an access token configured to grant access at least to the functional unit when an error is detected. Further, a method for granting secured access is described.

20 Claims, 3 Drawing Sheets

(52) U.S. Cl.
CPC ........ *H04L 63/0853* (2013.01); *H04L 63/108* (2013.01); *H04L 69/40* (2013.01); *G06F 2201/805* (2013.01)

(56) References Cited

U.S. PATENT DOCUMENTS

| | | | |
|---|---|---|---|
| 9,053,343 B1 | 6/2015 | Fuller et al. | |
| 9,584,762 B1 | 2/2017 | De La Paz | |
| 10,425,403 B2* | 9/2019 | Chen | H04L 9/3213 |
| 10,504,185 B1* | 12/2019 | Buentello | G06Q 40/06 |
| 2002/0129261 A1* | 9/2002 | Cromer | G06Q 20/341 |
| | | | 713/193 |
| 2009/0160609 A1* | 6/2009 | Lin | G06F 21/32 |
| | | | 340/5.83 |
| 2010/0164684 A1* | 7/2010 | Sasa | H04N 5/23219 |
| | | | 340/5.83 |
| 2012/0245941 A1* | 9/2012 | Cheyer | G06F 21/32 |
| | | | 704/246 |
| 2013/0276078 A1 | 10/2013 | Rockwell | |
| 2013/0336545 A1* | 12/2013 | Pritikin | G06K 9/00892 |
| | | | 382/116 |
| 2014/0324972 A1* | 10/2014 | Zhang | H04L 67/26 |
| | | | 709/204 |
| 2014/0372752 A1* | 12/2014 | Sallis | G06F 21/32 |
| | | | 713/165 |
| 2015/0237029 A1* | 8/2015 | Zhang | H04L 67/306 |
| | | | 726/6 |
| 2016/0234023 A1* | 8/2016 | Mozer | H04L 9/3231 |
| 2019/0312737 A1* | 10/2019 | Mani | H04L 9/3213 |

FOREIGN PATENT DOCUMENTS

| | | |
|---|---|---|
| CN | 205405912 U | 7/2016 |
| WO | 2015/042668 A2 | 4/2015 |

OTHER PUBLICATIONS

Extended European Search Report dated Jul. 4, 2017, issued in priority European Application No. 17172270.5, filed May 22, 2017, 8 pages.

* cited by examiner

SYSTEM FOR TRANSMITTING AUDIO AND/OR VIDEO DATA AND METHOD FOR GRANTING SECURED ACCESS

FIELD OF THE DISCLOSURE

Embodiments of the present disclosure relate to a system for transmitting audio and/or video data as well as a method for granting secured access.

BACKGROUND

In the state of the art, systems for transmitting audio and/or video data are known that use a virtual private network connection (VPN connection) in order to provide access to a functional unit of the system at a remote location, for instance a broadcasting and/or streaming unit, by using a mobile device such as a mobile phone. The VPN connection is typically used as it ensures high security while providing a secure infrastructure.

However, the implementation of a VPN connection is expensive and a lot of efforts are required in order to ensure that a user using a VPN connection has only access to certain information, for instance monitoring information, of the corresponding unit, or is allowed to change certain configurations of the system. Thus, a VPN connection is a complex system with regard to its implementation and configuration.

SUMMARY

Accordingly, there is a need for an easy and secure access possibility in order to configure a functional unit from a remote location.

Embodiments of the present disclosure provide a system for transmitting audio and/or video data comprising a functional unit configured to process the audio and/or video data and an error detection unit configured to detect an error in audio and/or video data processing wherein the system is configured to generate and transmit an access token configured to grant access at least partly to the functional unit when an error is detected.

Further, embodiments of the present disclosure provide a method for granting secured access to a functional unit of a system for processing audio and/or video data, with the following steps:

detecting an error in the processing of the audio and/or video data, and generating and transmitting an access token granting access to the functional unit at least partly when an error is detected.

Accordingly, a two factor authentication can be used in order to grant access to the functional unit of the system for transmitting audio and/or video data such that a secure access is provided from a remote location via the internet. This access is only granted if an error is detected. Accordingly, the access is only granted for fixing an occurring error within the system, in particular the functional unit. This ensures that inadvertent access is prohibited appropriately.

The functional unit may be part of a transmission device that is also configured to gather monitoring information of the functional unit and to transmit the monitoring information gathered. The occurrence of an error detected may be part of the monitoring information.

According to an aspect, the error detection unit is configured to output at least one alarm notification when an error is detected. For example, the alarm notification can be outputted prior to transmitting the access token. Thus, no access is granted until an alarm notification was outputted. This ensures that the access is restricted. The alarm notification may be outputted shortly prior to the transmission of the access token such that only a very short time delay occurs. Hence, the problem may be fixed quickly.

According to another aspect, the system comprises a web-enabled end device configured to receive the access token generated. The web-enabled end device may be a mobile device such as a mobile phone, a tablet or a notebook.

The web-enabled end device may also be configured to receive the alarm notification outputted.

A cloud unit may be provided that is configured to send the access token. The cloud unit may be (indirectly) connected to the functional unit wherein the cloud unit may receive the monitoring information gathered via a secure connection.

Alternatively, the functional unit, for example the transmission device comprising the functional unit, may generate and transmit the alarm notification directly.

According to another aspect, the system comprises a configuration device that is configured to access the functional unit at least partly when the access token generated is entered. The configuration device may be a separately formed device with regard to the end device receiving the access token generated. This improves the security level as the holder of the end device must have access to the specific configuration device for accessing the functional unit at least partly.

In some embodiments, the access token generated is configured to only grant access to the portion of the functional unit which causes the error. This ensures that the other portions of the system, for example the functional unit, stay protected as the user receiving the access token is only allowed to access the specific portion being defective in order to solve the corresponding problem.

According to a certain embodiment, the access token generated is configured to grant access to the functional unit according to a predetermined setting, in particular at least one of full, partial, and restricted access. Therefore, the user is enabled to access other parts or portions of the system in order to adapt or change at least one of settings and configurations. This predetermined setting may be set by an admin in advance. Nevertheless, other parts and portions which should not be accessed can be maintained protected while limiting the access if wanted.

Further, the predetermined setting may be related to the kind of error detected. For instance, certain errors typically relate to different parts and portions of the system such that the user is enabled to access all of these parts and portions of the system in order to fix the error effectively, for instance several functional units.

The access token generated may be configured to grant access for a predefined time interval. In some embodiment, the time interval is configurable. Therefore, the user is enabled to access the system for a certain time period. This ensures that the user may not have further access to the system while the error has already been fixed, for instance by another user or operator.

According to a certain embodiment, the access token generated is configured to become invalid when the error detection unit outputs a notification indicating normal operation of the system. The system checks whether the error was fixed and outputs a notification appropriately. Once the notification is outputted indicating normal operation of the system, in particular the functional unit, all access tokens generated become invalid in order to protect the system as further access to the running system is denied.

According to an aspect, an alarm notification is outputted when the error is detected. In some embodiments, the alarm notification is outputted prior to transmitting the access token. Thus, no access is granted until an alarm notification is outputted. This ensures that the access is restricted appropriately. The alarm notification may be outputted shortly prior to the transmission of the access token such that a very short time delay occurs. Hence, the problem may be fixed quickly.

According to another aspect, the access token grants access in a predetermined manner, for example. full access, partial access, restricted access and/or access to the portion of the functional unit causing the error. For instance, access is granted to the functional unit according to a predetermined setting. Therefore, the user is enabled to access other parts or portions of the system, for instance several functional units simultaneously, in order to adapt or change at least one of the settings and the configurations. The predetermined settings may be set by an admin in advance.

Nevertheless, other parts and portions which should not be accessed can be maintained protected while limiting the access if wanted.

Further, the access token grants only access to the part or portion of the system that causes the error. Accordingly, the user is only allowed to access this specific part or portion of the whole system.

As the access token generated is only valid for a predefined time interval, it is ensured that the access is limited with regard to time which protects the system appropriately.

Moreover, the access token generated may become invalid once a notification is outputted indicating normal operation of the system. Accordingly, the user is only allowed to access the system as long as an error still occurs. Once no error is present, there is no need to access the system as it is running appropriately.

The system may do self-checks in order to verify its status with regard to errors. These self-checks may be performed regularly, for instance periodically. Further, self-checks can be performed automatically once an alarm notification was outputted.

In some embodiments, the access token is used on a configuration device enabling access to the functional unit at least partly when a valid access token is entered. Accordingly, the holder of the end device receiving the access token generated also needs access to a specific configuration device for accessing the system, for example the functional unit, in order to fix the error occurring.

In a certain embodiment with regard to the system and the method, the configuration device and the end device are the same device. For instance, the user receives the access token on a smartphone wherein this smartphone can also be used for accessing the system, for example the functional unit.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
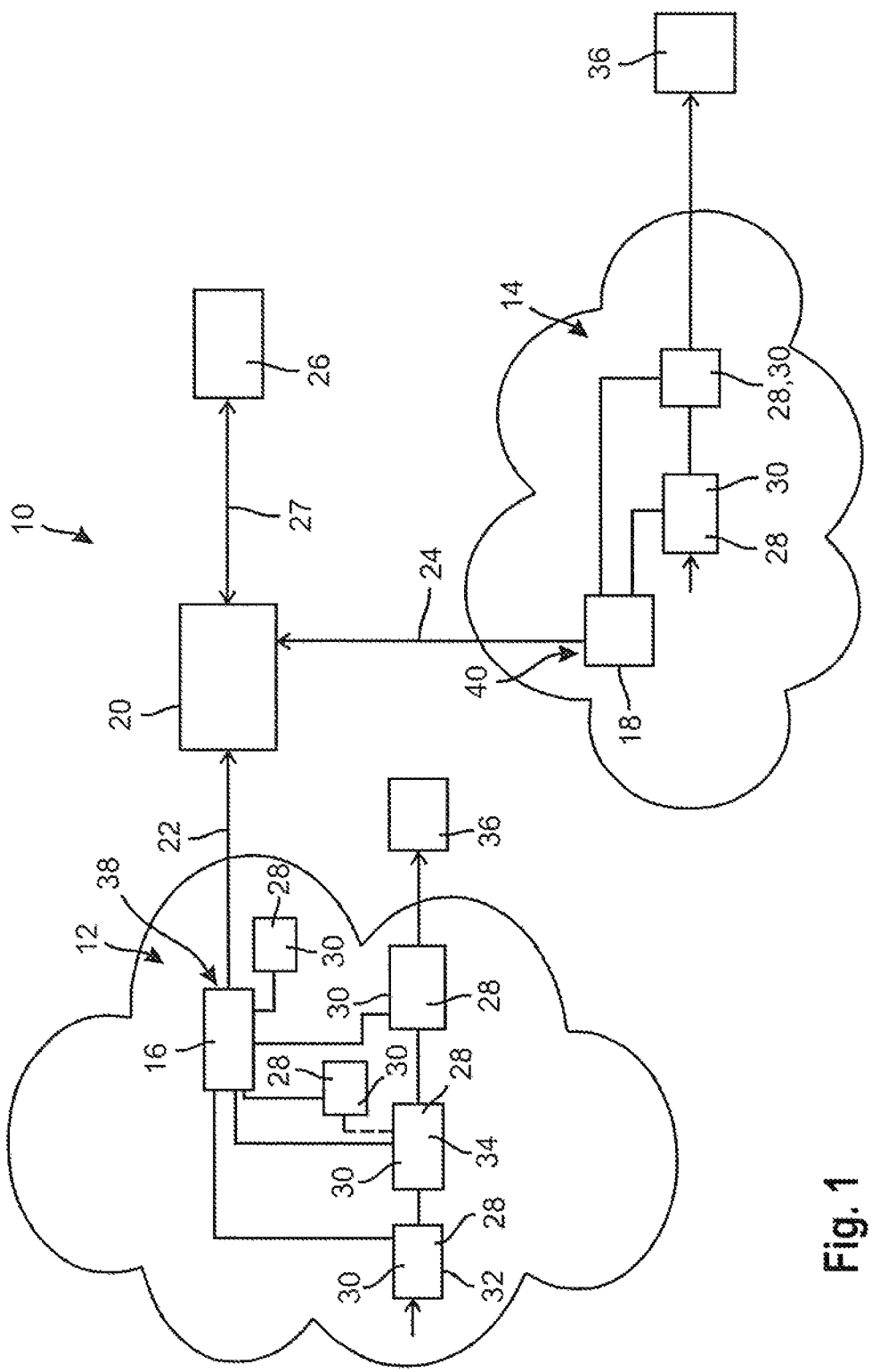
FIG. 1 shows a system for transmitting audio and/or video data according to the disclosure.

In FIG. 1, a system 10 for transmitting audio and/or video data is shown. This system 10 is also configured to transmit monitoring information. As shown in FIG. 1, the system 10 comprises two different locations 12, 14 each being defined by a local intranet area. The different location 12, 14 each comprise a transmitter, such as transmission device 16, 18, respectively, for transmitting monitoring information.

The system 10 further comprises a central cloud unit 20 that has established a first secure connection 22 to the first transmission device 16 of the first location 12 and a second secure connection 24 to the second transmission device 18 of the second location 14. Both secure connections 22, 24 each are unidirectional ones with regard to the data transfer which means that data can only be transmitted in one direction, for example from the transmission devices 16, 18 to the cloud unit 20.

However, a protocol can be used ensuring a bidirectional connection such as an Internet Protocol (IP) or a Transmission Control Protocol (TCP) in order to enable the exchange of acknowledgement signals, for example sending acknowledgement signals from the central cloud unit 20 to the transmission device 16, 18.

Nevertheless, in some embodiments the data transfer is a unidirectional one as the transmission device 16, 18 can send data (packages) to the central cloud unit 20 whereas the central cloud unit 20 cannot send data (packages) to the transmission device 16, 18. Accordingly, the central cloud unit 16, 18 has no direct access to the data on the transmission devices 16, 18.

In the shown embodiment, the system 10 also comprises an end device 26 being a mobile device such as a mobile phone, a tablet or a notebook. The end device 26 has access to the cloud unit 20 via the web such that a bidirectional connection 27 between the end device 26 and the cloud unit 20 is established. Accordingly, the end device 26 is web-enabled wherein the cloud unit 20 provides an appropriate web interface.

As shown for the first location 12, the first transmission device 16 communicates with different functional units 28 such that monitoring information is gathered by the transmission device 16. This monitoring information gathered is forwarded to the cloud unit 20 such that this information is provided to the user having access to the cloud unit 20 by its end device 26.

In the shown embodiment, the functional units 28 are established by broadcasting and/or streaming units 30, for instance a serial digital interface 32 (SDI), an encoder 34 (ENC) and other devices and/or units. In general, the broadcasting and/or streaming units 30 are configured to generate a transport stream that is transmitted to a local receiving unit 36 which is allocated to the dedicated first location 12, for instance Munich, Germany. The local receiving unit 36 may be a television or any other device configured to display the broadcasting and/or streaming data related to the transport stream generated by the broadcasting and/or streaming units 30.

In a similar manner, the second location 14 comprises several functional units 28 being broadcasting and/or streaming units 30 that are used for generating a transport stream comprising broadcasting and/or streaming data. The transport stream generated is transmitted to a local receiving unit 36 being allocated to the second location 14, for instance Hamburg, Germany.

Generally, the transmission devices 16, 18 each gather monitoring information from the several functional units 28 being allocated to the corresponding location 12, 14, for example the broadcasting and/or streaming units 30. The transmission devices 16, 18 forward the monitoring information gathered from the different functional units 18 to the cloud unit 20 via the corresponding secure connection 22, 24 for instance a secure hypertext transfer protocol connection (https connection).

The transmission devices 16, 18 are configured to transmit legacy messages via the dedicated secure connection 22, 24 to the cloud unit 20 such that the monitoring information can be transmitted in an easy manner, for instance.

Even though the transport devices 16, 18 each gather the monitoring information of several functional units 28, for example the broadcasting and/or streaming units 30, the monitoring information is forwarded to the cloud unit 20 via a single outgoing port 38, 40 for each location 12, 14. Thus, the outgoing ports 38, 40 are common outgoing ports for all function units 28 of each location 12, 14. The security for transmitting the monitoring information to the cloud unit 20 is easier to establish as only a single outgoing port 38, 40 has to be secured appropriately. In addition, it is easier to install a firewall protecting only the single outgoing port 38, 40 instead of several outgoing ports for each functional unit 28.

The end device 26 has only access to the cloud unit 20 as it has no access to the functional units 28 themselves via the cloud unit 20, for instance. Thus, the end device 26 may use a standard network application for accessing the cloud unit 20 since the cloud unit 20 only provides the monitoring information forwarded by the transport device(s) 16, 18. The user has no access to the functional units 28, in particular the broadcasting and/or streaming units 30, in order to control the functional units 28. This is inter alia ensured by establishing a unidirectional connection 22, 24 between each transmission device 16, 18 and the central cloud unit 20.

In addition, the cloud unit 20 provides a web interface for user login. Thus, the user accessing the cloud unit 20 via the end device 26 needs a user login. Depending on the user login, for example the user rights related to the specific user login, only certain portions of the monitoring information gathered can be accessed by the user. Thus, all the information gathered can be provided partly depending on the user rights, role profile or login credential.

Furthermore, the cloud unit 20 may be established by several different devices, in particular computational units, providing together an increased computational power such that deeper and more complex analyses can be applied for analyzing the different monitoring information forwarded to the cloud unit 20 by the several transport devices 16, 18, for example, the transport devices 16, 18 located at different locations 12, 14.

As the transport devices 16, 18 forward the monitoring information of several separately formed functional units 28, particularly broadcasting and/or streaming units 30, deeper and more complex analyses can be performed for gathering more information about the services provided, for instance broadcasting and/or streaming services.

Generally, the transmission devices 16, 18 may comprise a functional unit 28, in particular a broadcasting and/or streaming unit 30.

Accordingly, a system 10 is provided that ensures that the user has easy and secure access to the monitoring information of different locations 12, 14 while it is simultaneously ensured that the user is not enabled to control the functional units 28 which monitoring information is accessible by the user. Hence, unwanted access to the functional units 28 is prevented effectively and easily. The security of the whole system 10 is increased appropriately.

Figure 2:
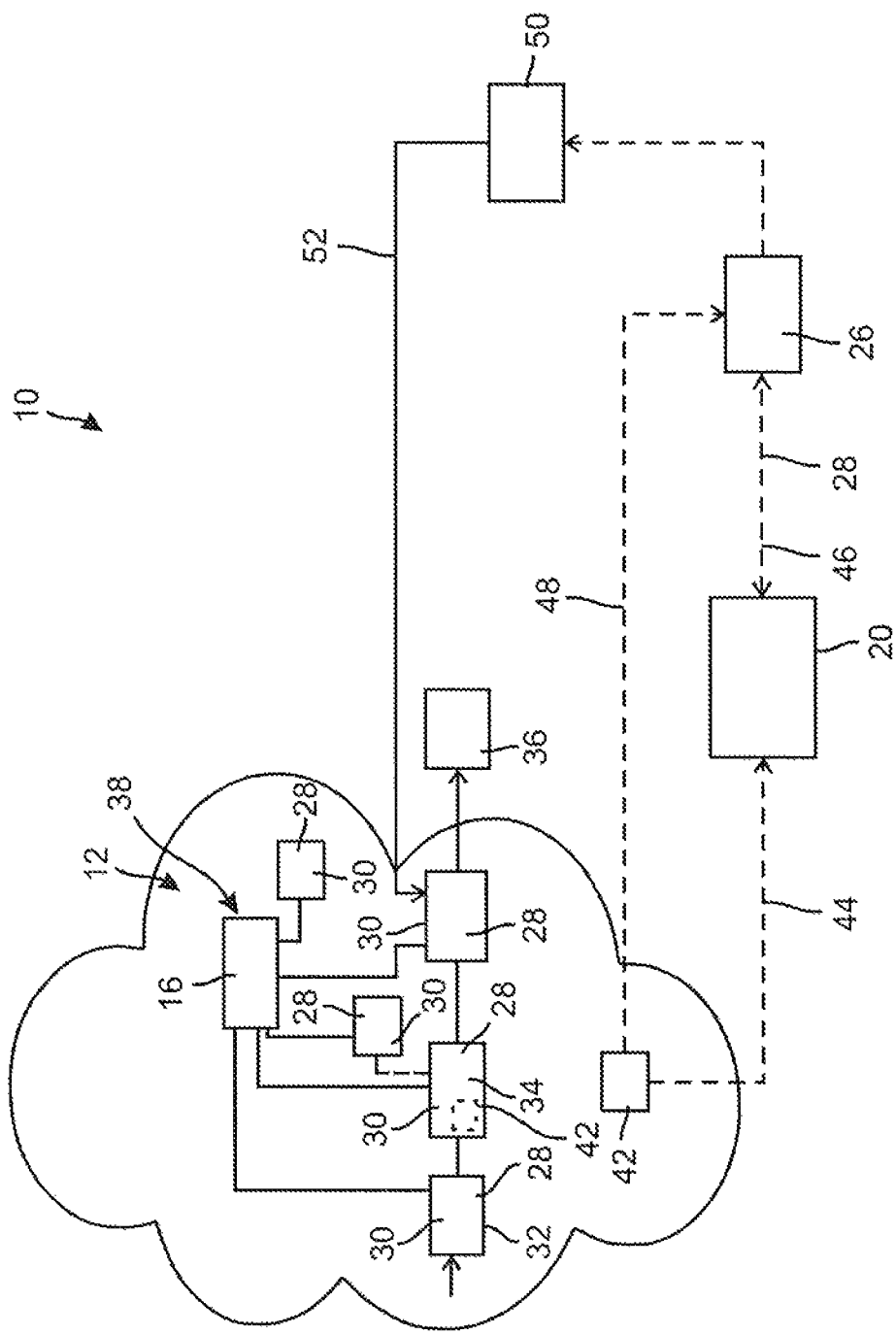
FIG. 2 shows a detail view of a system according to the disclosure.
Figure 3:
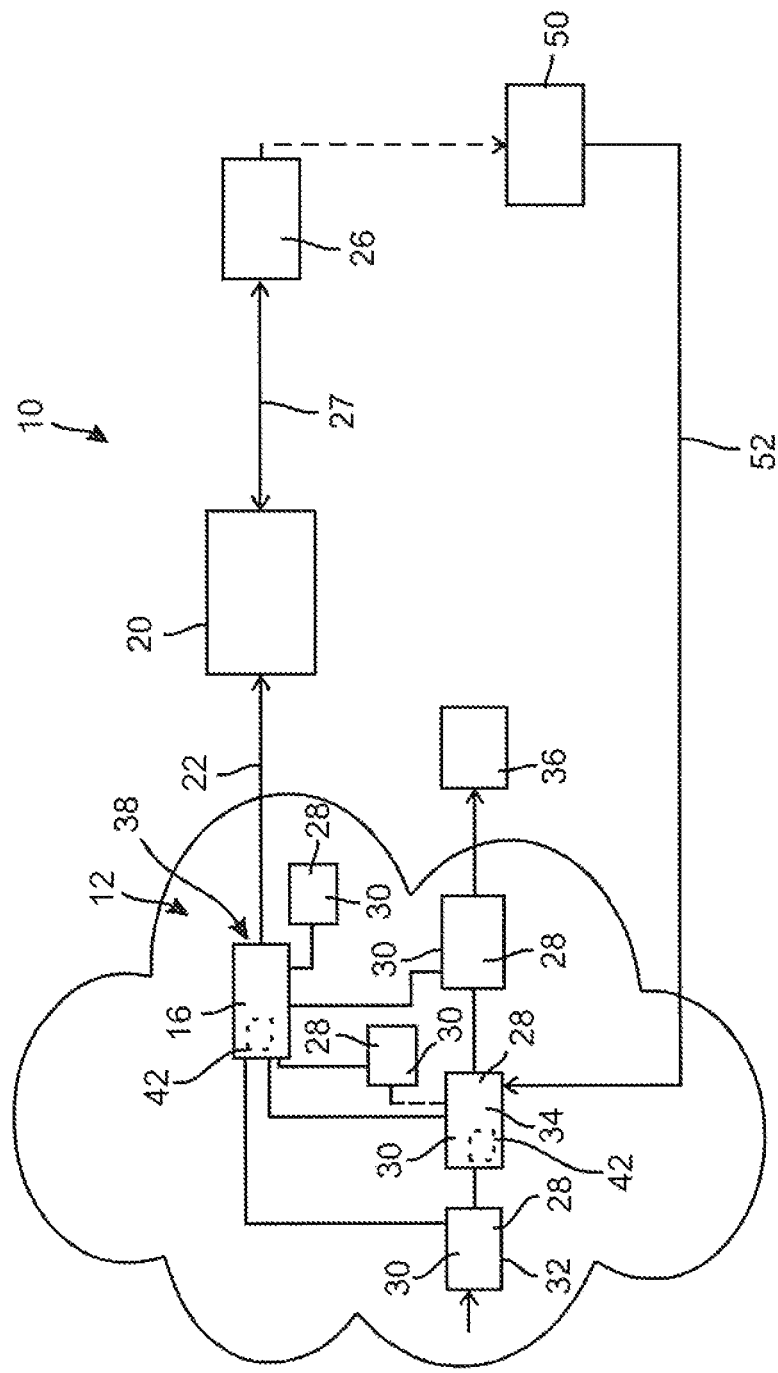
FIG. 3 shows a detail view of a system according to the disclosure.

Despite the monitoring information, the system 10 also enables a user to detect an error occurring in one of the functional units 28, for instance the broadcasting and/or streaming units 30. Further, the system 10 is configured to grant access to the system 10 at least partly, for instance the functional unit 28, such that the user is enabled to fix the error occurred. This will be described hereinafter while also referring to FIGS. 2 and 3 showing the first location 12 in detail.

The system 10 comprises at each location 12, 14 an error detection unit 42 that are connected to each functional unit 28 of the system 10 at the corresponding location 12, 14. Hence, errors occurring in the dedicated functional units 28, namely the audio and/or video data processing, can be detected by the respective error detection unit 42.

Once an error is detected, the system 10, in particular the detection unit 42, generates and outputs an alarm notification to be received by a user that is allowed to fix the error.

According to a first embodiment, the alarm notification is transmitted via a transmission path 44 to the cloud unit 20 that in turn forwards the alarm notification to the web-enabled end device 26 via another transmission path 46 being a unidirectional or bidirectional one, for instance the bidirectional connection 27. The transmission path 44 between the detection unit 42 and the cloud unit 20 may be established by a secure connection being a unidirectional one with regard to data transfer. However, acknowledgement signals may be transmitted bidirectional.

For instance, the cloud unit 20 is configured to transmit the alarm notification to all end devices 26 registered at the cloud unit 20 such that a plurality of users are informed appropriately via the cloud unit 20.

In another embodiment, the detection unit 42 directly transmits the alarm notification to the web-enabled end device(s) 26 via a direct transmission path 48. Accordingly, the information is directly forwarded in an appropriate manner to the user(s).

After outputting the alarm notification, the system 10 generates an access token that can be transmitted via the same transmission paths 44, 46, 48 to the web-enabled end device(s) 26 wherein the access token grants access to the system 10 outside of the local intranet area defined by the location 12.

Each web-enabled end device 26 is configured to receive the access token generated directly or via the cloud unit 20. Once the access token is received, the user is enabled to use the access token to access the system 10 by using the access token, for instance an identification number, at a configuration device 50 being separately formed with regard to the end device 26.

As shown in FIG. 2, the configuration device 50 is also located outside of the local intranet area corresponding to the first location 12. In general, the configuration device 50 may have a user interface module enabling access to the system 10, for example the parts and portions located at the first location 12. The configuration device 50 enables access to the functional unit 28 of the system 10 that causes the error detected by the error detection unit 42 such that the user entering the access token is enabled to fix the error by accessing the dedicated functional unit 28. While having access to the functional unit 28, the user is enabled to adapt settings of the functional unit 28 in order to solve the problem.

As shown in FIG. 2, a unidirectional connection 52 may be established between the functional unit 28 and the configuration device 50 wherein the connection 52 is a secure one. The secure connection 52 may be established by the same standards as mentioned above with regard to the secure connections 22, 24 described with regard to FIG. 1. However, the connection 52 may be established such that acknowledgement signals and the like are transmitted in a bidirectional matter.

In general, the access token generated may be configured such that the user can only access a certain portion of the functional unit 28 in order to adapt settings and/or configurations of that portion. Thus, it is ensured that the other parts and portions of the system 10 stay protected. The user is only enabled to access the system 10 for fixing the problem.

In addition, the system 10 may have a presetting according to which any access token generated provides access to certain portions and/or parts of the system 10, for instance full access, partial access (some functional units 28) or restricted access (only portions of function units 28).

Moreover, the system 10 may generate different access tokens such that the access token generated grants full access, partial access or restricted access. The kind of access token generated may depend on the error detected by the error detection unit 42.

Furthermore, the access token generated may stay valid only for a predefined time interval, for instance 5 minutes. In case that the access token generated was not used within this time interval, the access token becomes invalid. This reduces the risk that third persons have access to the system 10 even though they are not authorized to do so. The time interval may be configured according to the needs of an operator of the system 10. Therefore, the time interval of 5 minutes may be a presetting that can be adapted appropriately.

In addition, the access token generated becomes invalid once the error detection unit 42 detects that the error has been fixed while outputting a corresponding notification that indicates normal operation of the system 10.

Accordingly, the system 10 enables the user to access the system 10 at least partly while providing a two factor authentication.

Accessing the running system 10 is only possible if the error detection unit 42 detects an error. Moreover, the error is reported initially by transmitting the alarm notification wherein the access token is transmitted directly afterwards. Thus, a very short, and in some embodiments no delay, occurs such that the problem is solved immediately.

Alternatively, the functional units 28 each have an integrated error detection unit 42 (dashed lines) such that the functional units 28 detect an occurring error themselves.

In FIG. 3, the detection of an error in the functional unit 28 is detected (by the error detection unit 42) wherein this information is forwarded to the transmission unit 16.

The transmission unit 16 transmits this monitoring information via the secure connection 22 as already described with regard to FIG. 1. Further, the transmission unit 16 outputs the alarm notification as well as the access token via the secure connection 22 for the location 12. Accordingly, the transmission unit 16 comprises the error detection unit 42 at least partly.

Then, the alarm notification and the access token are received by the cloud unit 20 wherein the cloud unit 20 forwards both to the end device 26 via the bidirectional connection 27. Once the user receives the access token as already described with regard to FIG. 2, the access token is entered via the user interface module of the configuration device 50 for accessing the system 10 at least partly, in particular the corresponding functional unit 28 forwarding the monitoring information concerning the error to the transmission device 16.

This embodiment ensures that only one connection has to be established between the local intranet area defined by the location 12 and the internet outside that local intranet area.

Regarding the access token, for example its validity and access level, reference is made to the specification related to FIG. 2 wherein the same features also apply for this embodiment.

Accordingly, the efforts required for protecting the system 10 against unauthorized access are simplified appropriately.

In FIGS. 2 and 3, the location 12 was only described. However, this concept also applies for each other location of the system 10.

In general, a system 10 as well as a method are provided that ensure easy and secure access to the system 10 configured to process video and/or audio data even though the user accesses the system 10 from the outside of the local intranet area.

It will be appreciated that several components, including but not limited to the function units, broadcasting and/or streaming units, cloud unit, error detection unit, mobile device, etc., have been described herein as "processing" signals or that various signals are being "analyzed" by such components. This analysis or processing, or any other functionality described herein, can be carried out in some embodiments of the present disclosure by analog circuitry, digital circuitry, or a combination of analog and digital circuitry, and can include discrete digital or analog circuit elements or electronics, or combinations thereof. Such circuitry is configured and arranged in order to implement the technologies and methodologies set forth herein.

These components may include, in some embodiments, logic for implementing the technologies and methodologies described herein. This logic can be carried out in either hardware or software, or a combination of hardware and software. In some embodiments, one or more of these components includes one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof. In some embodiments, one or more of these components includes a microprocessor and a memory storing logic modules and/or instructions. In an embodiment, one or more of these components includes one or more ASICs having a plurality of predefined logic components. In an embodiment, one or more of these components includes one or more FPGA having a plurality of programmable logic components. In an embodiment, one or more of these components includes hardware circuit implementations (e.g., implementations in analog circuitry, implementations in digital circuitry, and the like, and combinations thereof). In an embodiment, one or more of these components includes combinations of circuits and computer program products having software or firmware instructions stored on one or more computer readable memories that work together to cause a device to perform one or more methodologies or technologies described herein. Of course, in some embodiments, two or more of these components can be integrated or share hardware and/or software, circuitry, etc.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A system for transmitting audio and/or video data comprising:
   a functional circuit configured to process audio and/or video data and an error detection circuit configured to detect an error in audio and/or video data processing, the system being configured to generate and transmit an access token to a user, wherein the access token is configured to grant access at least partly to the functional circuit when an error is detected, wherein the access token generated is configured to grant access at least to the portion of the functional circuit which causes the error, wherein the user is enabled to adapt settings of the functional circuit while having access to the functional circuit, and wherein the access is only granted for fixing the occurring error within the functional circuit ensuring that inadvertent access is prohibited.

2. The system according to claim 1, wherein the error detection circuit is configured to output at least one alarm notification when an error is detected.

3. The system according to claim 2, wherein the alarm notification is outputted prior to transmitting the access token.

4. The system according to claim 1, wherein the system comprises a web-enabled end device configured to receive the access token generated.

5. The system according to claim 1, wherein a cloud circuit is provided that is configured to send the access token.

6. The system according to claim 1, wherein the system comprises a configuration device that is configured to access the functional circuit at least partly when the access token generated is entered.

7. The system according to claim 1, wherein the access token generated is configured to only grant access to the portion of the functional circuit which causes the error.

8. The system according to claim 1, wherein the access token generated is configured to grant access to the functional circuit according to a predetermined setting.

9. The system according to claim 8, wherein the access token generated is configured to grant at least one of full, partial, and restricted access.

10. The system according to claim 1, wherein the access token generated is configured to grant access for a predefined time interval.

11. The system according to claim 10, wherein the time interval is configurable.

12. The system according to claim 1, wherein the access token generated is configured to become invalid when the error detection circuit outputs a notification indicating normal operation of the system.

13. A method for granting secured access to a functional circuit of a system for processing audio and/or video data, with the following steps:
    detecting an error in the processing of the audio and/or video data; and
    generating and transmitting an access token to a user, the access token granting access to the functional circuit at least partly when an error is detected, wherein the access token generated is configured to grant access at least to the portion of the functional circuit which causes the error, wherein the user is enabled to adapt settings of the functional circuit while having access to the functional circuit in order to solve the problem, and wherein the access is only granted for fixing the occurring error within the functional circuit ensuring that inadvertent access is prohibited.

14. The method according to claim 13, wherein an alarm notification is outputted when the error is detected.

15. The method according to claim 14, wherein the alarm notification is outputted prior to transmitting the access token.

16. The method according to claim 13, wherein the access token grants access in a predetermined manner.

17. The method according to claim 16, wherein the access token grants full access, partial access, restricted access and/or access to the portion of the functional circuit causing the error.

18. The method according to claim 13, wherein the access token generated is only valid for a predefined time interval.

19. The method according to claim 13, wherein the access token generated becomes invalid once a notification is outputted indicating normal operation of the system.

20. The method according to claim 13, wherein the access token is used on a configuration device enabling access to the functional circuit at least partly when a valid access token is entered.

* * * * *